United States Patent [19]

Bolz

[11] Patent Number: 4,919,012

[45] Date of Patent: Apr. 24, 1990

[54] PILOT OPERATED SOLENOID VALVE IN AN AUTOMATIC TRANSMISSION CONTROL CIRCUIT

[75] Inventor: Ralph C. Bolz, Livonia, Mich.

[73] Assignee: Ford Motor Company, Dearborn, Mich.

[21] Appl. No.: 317,400

[22] Filed: Mar. 1, 1989

[51] Int. Cl.$^5$ .............................................. B60K 41/06
[52] U.S. Cl. ........................................ 74/866; 74/867; 364/424.1
[58] Field of Search ................. 74/865, 866, 867, 868, 74/869, 877; 364/424.1

[56] References Cited

U.S. PATENT DOCUMENTS

| | | | |
|---|---|---|---|
| 3,525,275 | 8/1970 | Lemieux | 74/868 |
| 3,727,487 | 4/1973 | Förster et al. | 74/865 |
| 3,783,713 | 1/1974 | Will | 74/865 |
| 3,859,873 | 1/1975 | Miyauchi et al. | 74/867 |
| 4,331,045 | 5/1982 | Piech et al. | 74/877 X |
| 4,351,206 | 9/1982 | Lemieux et al. | 74/866 |
| 4,369,677 | 1/1983 | Lewis | 74/868 X |
| 4,394,827 | 7/1983 | Kubo et al. | 74/868 |
| 4,476,745 | 10/1984 | Moan | 74/869 X |
| 4,494,640 | 1/1985 | Honig | 74/877 X |
| 4,633,738 | 1/1987 | Timte | 74/869 |
| 4,693,049 | 2/1987 | Nishikawa et al. | 74/867 X |
| 4,790,217 | 12/1988 | Kawono et al. | 74/868 |
| 4,829,853 | 5/1989 | Sakaguchi | 74/869 |

Primary Examiner—Dwight G. Diehl
Attorney, Agent, or Firm—Donald J. Harrington; Frank G. McKenzie; Keith L. Zerschling

[57] ABSTRACT

A throttle valve system for an automatic transmission control circuit comprising a solenoid pilot valve and a pressure regulating throttle pressure spool valve for developing a throttle valve pressure for use in initiating control functions in a multiple ratio transmission wherein the output signal of the throttle valve can be used as an indicator of the driving torque wherein the force requirements of the variable force solenoid are reduced and wherein the sensitivity of the pressure regulating throttle valve to the output signal of the pilot valve and to changes in engine torque is improved relative to prior art throttle valve systems, the pilot valve being effective to control a larger flow insensitive regulating valve and the stroke of the solenoid actuator for the pilot valve being minimal.

11 Claims, 12 Drawing Sheets

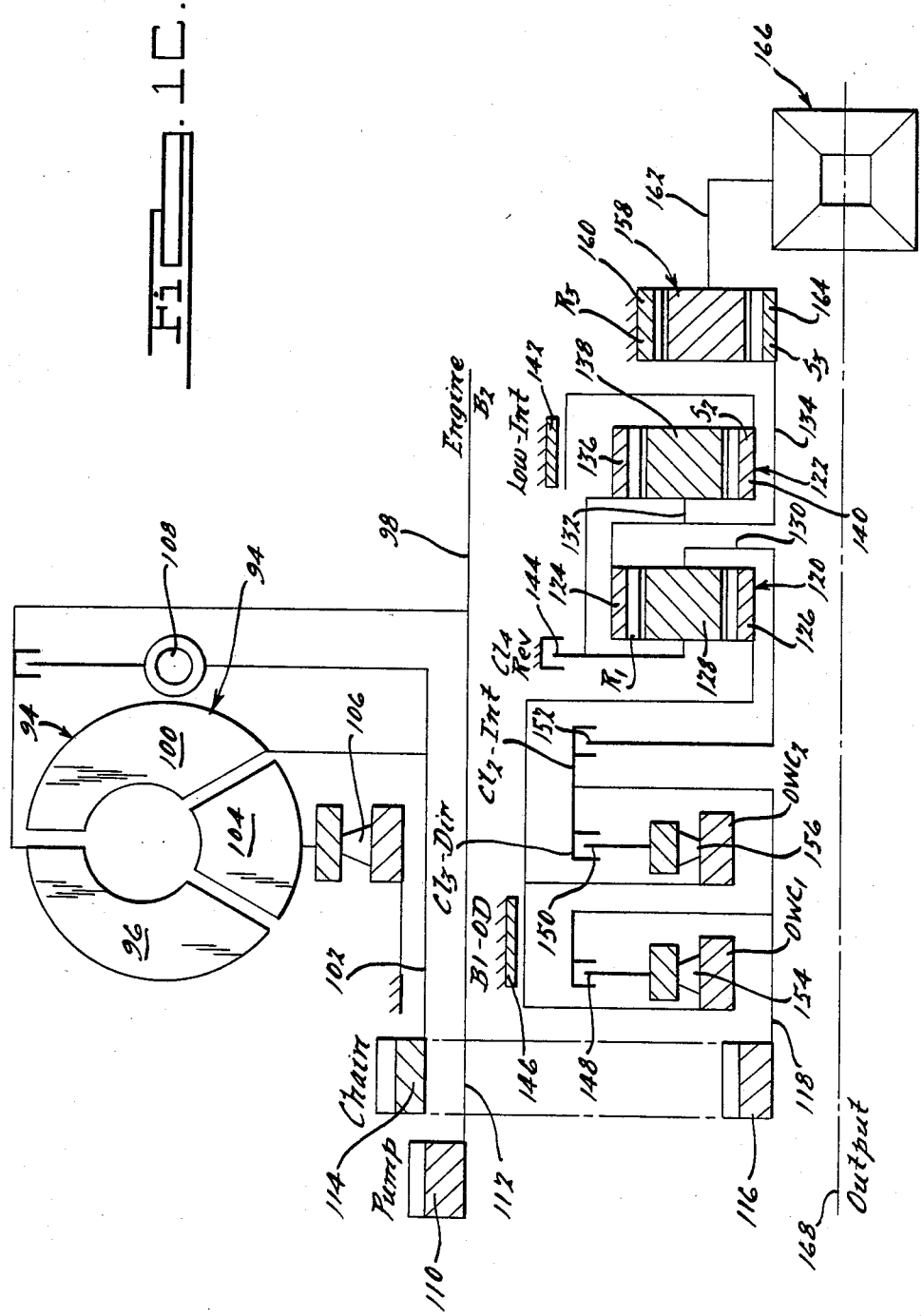

| Gear | $Cl_1$ | $Cl_2$ | $Cl_3$ | $Cl_4$ | $B_1$ | $B_2$ | Drive | | Coast | | Ratio |
|---|---|---|---|---|---|---|---|---|---|---|---|
| | | | | | | | $OWC_1$ | $OWC_2$ | $OWC_1$ | $OWC_2$ | |
| 1M | X | | X | | | X | X | | | X | 2.779 |
| 1D | X | | | | | X | X | | O/R | | 2.779 |
| 2 | X | X | | | | X | O/R | | O/R | | 1.512 |
| 3 | X | X | X | | | | | X | X | | 1.000 |
| 4 | | X | X | X | | | | O/R | | O/R | .712 |
| R | X | | X | X | | | X | | | X | 2.474 |

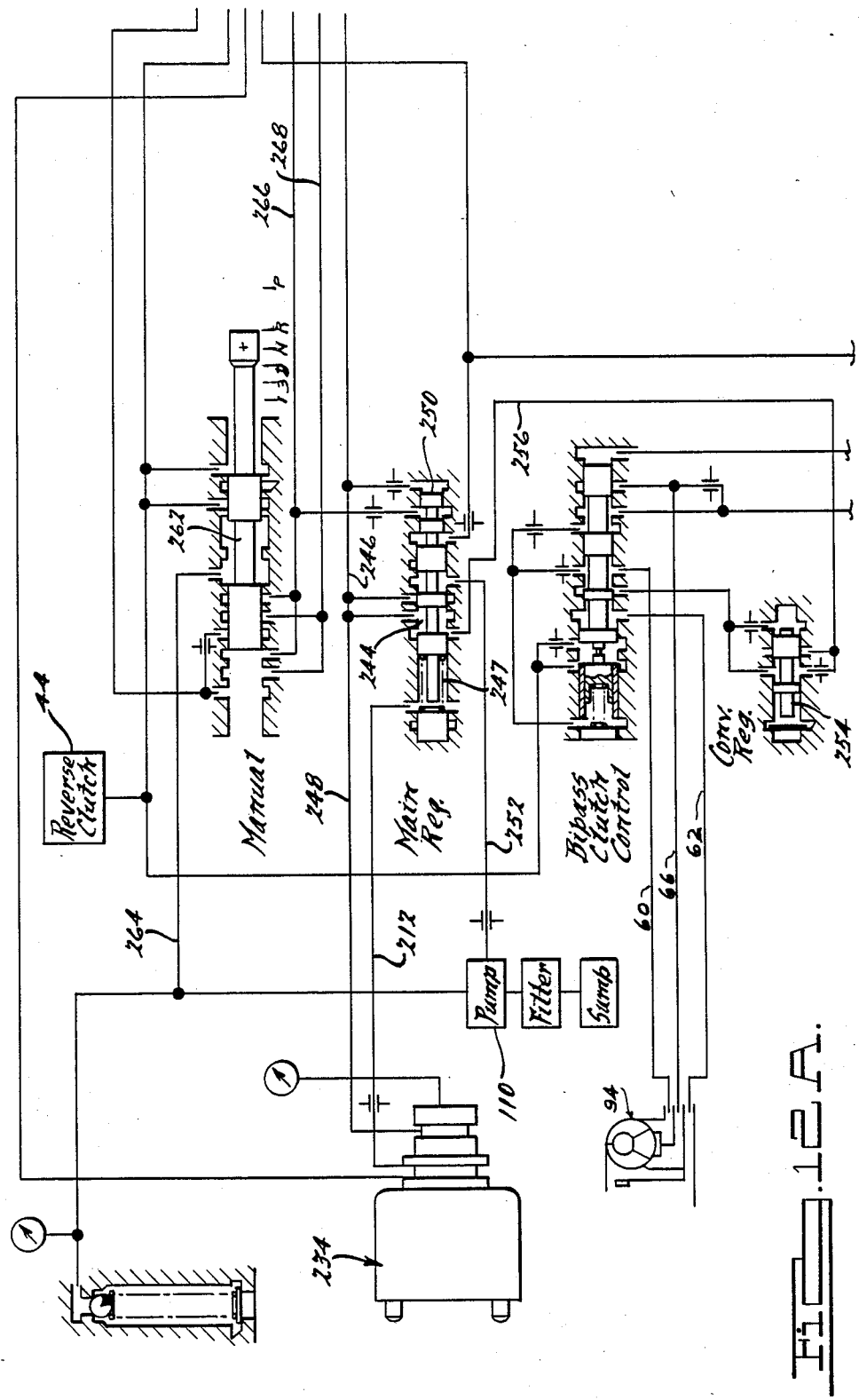

PILOT OPERATED SOLENOID VALVE IN AN AUTOMATIC TRANSMISSION CONTROL CIRCUIT

BACKGROUND OF THE INVENTION

My invention comprises improvements in a throttle valve system for use in controlling shift points and line pressure in an automatic transmission valve circuit. Examples of automatic transmission valve controls using throttle valve pressure as an indicator of engine torque are disclosed in U.S. Pat. No. 3,525,275 and 4,351,206, each of which is assigned to the assignee of this invention. In the valve system of the '275 patent a throttle valve in the form of a pressure regulating valve spool is connected mechanically by means of a lever arrangement or an actuator cable to the engine carburetor throttle. The output of that regulating valve is distributed to a throttle pressure booster, and the output of the booster in turn is used to establish shift points.

The shift points are determined by shift valves that are subjected to the output of the throttle pressure booster valve and to the output of a pressure governor Solenoid operated valves establish pressure forces on a downshift control valve that overrules the automatic upshifting and downshifting tendencies of the valve circuit of the '275 patent.

In the case of the control system of the '206 patent, line pressure is regulated for distribution to pressure servos for the transmission clutches and brakes. The line pressure regulator comprises a solenoid operated valve that establishes variable forces on a regulator valve element which in effect is a regulator similar to the throttle pressure regulator valve of the '275 patent although it performs a different regulating function.

I am aware of various electronic control systems for automatic transmissions that use a pilot operated throttle valve wherein the throttle valve is actuated by a varible force solenoid rather than a system such as those shown in the aforementioned patents. The output pressure of the solenoid valve acts directly on the regulating valve, either the pressure regulator or the throttle valve regulator. Examples of such systems are disclosed in U.S. Pat. Nos. 3,727,487 and 3,783,713. The latter patent uses a throttle valve or kickdown valve spool that is actuated by a solenoid but the solenoid force acts directly on a slide valve that is biased by a spring. This requires a solenoid force that is relatively high and the travel of the armature of the solenoid actuator for the valve is relatively large because of the necessity for long travel of the slide valve.

The system shown in the '487 patent avoids the necessity for using a spool valve that requires long travel and which is susceptible to valve sticking, but in that arrangement the pilot valve is subjected directly to the full output pressure of the pump. The system then is relatively unstable because pump pressure variations will cause corresponding variations in the throttle valve system as a whole.

BRIEF DESCRIPTION OF THE INVENTION

My improved throttle valve design avoids shortcomings in the controls described in the prior art patents described above. It does this by isolating the pilot valve from the pump so that pressure variations in the pump do not cause the throttle valve system to become unstable. Further, the travel required of the pilot valve of my design is minimal and it is possible to include in the pilot valve arrangement a relatively large flow orifice thereby eliminating the possibility of an interruption in the flow of fluid to and from the valve because of contamination in the fluid.

The improved valve system of my invention eliminates the necessity for a mechanical linkage or cable connection between the throttle valve and the engine carburetor by providing a pressure signal that is developed by a solenoid valve wherein the solenoid valve is under the control of a microprocessor having a shift schedule and TV control module that responds to engine throttle position, engine speed, vehicle speed and other driveline sensor outputs. The processor includes a central processing unit that processes the information to produce output signals through an output driver citrcuit. That signal is used to establish shift points and to operate a transmission torque converter lockup clutch.

My improved valve system is characterized also by its ability to establish a relatively high throttle pressure in the event of an electrical failure in the transmission system. Unlike certain prior art arrangements, the line pressure will reach a maximum value in such event thereby assuring that the clutch and brake servos in the transmission system will have adequate torque capacity to accommodate the driving torque.

Another advantage of my improved system is the ability of the pilot valve to establish a throttle valve signal over a relatively broad range of solenoid pressure variations. This improves the sensitivity of the system and simplifies the calibration procedure.

BRIEF DESCRIPTION OF THE FIGURES OF THE DRAWINGS

FIGS. 1B and 1C show a schematic representation of a valve body and gear system having clutch and brake servos that are controlled by an automatic transmission control valve system of which the improved pilot operated throttle valve system of my invention is a part.

FIGS. 12A and 12B show a valve circuit for an automatic transmission control valve system capable of employing the improved throttle valve assembly of my invention.

PARTICULAR DESCRIPTION OF THE INVENTION

Figure 1A:
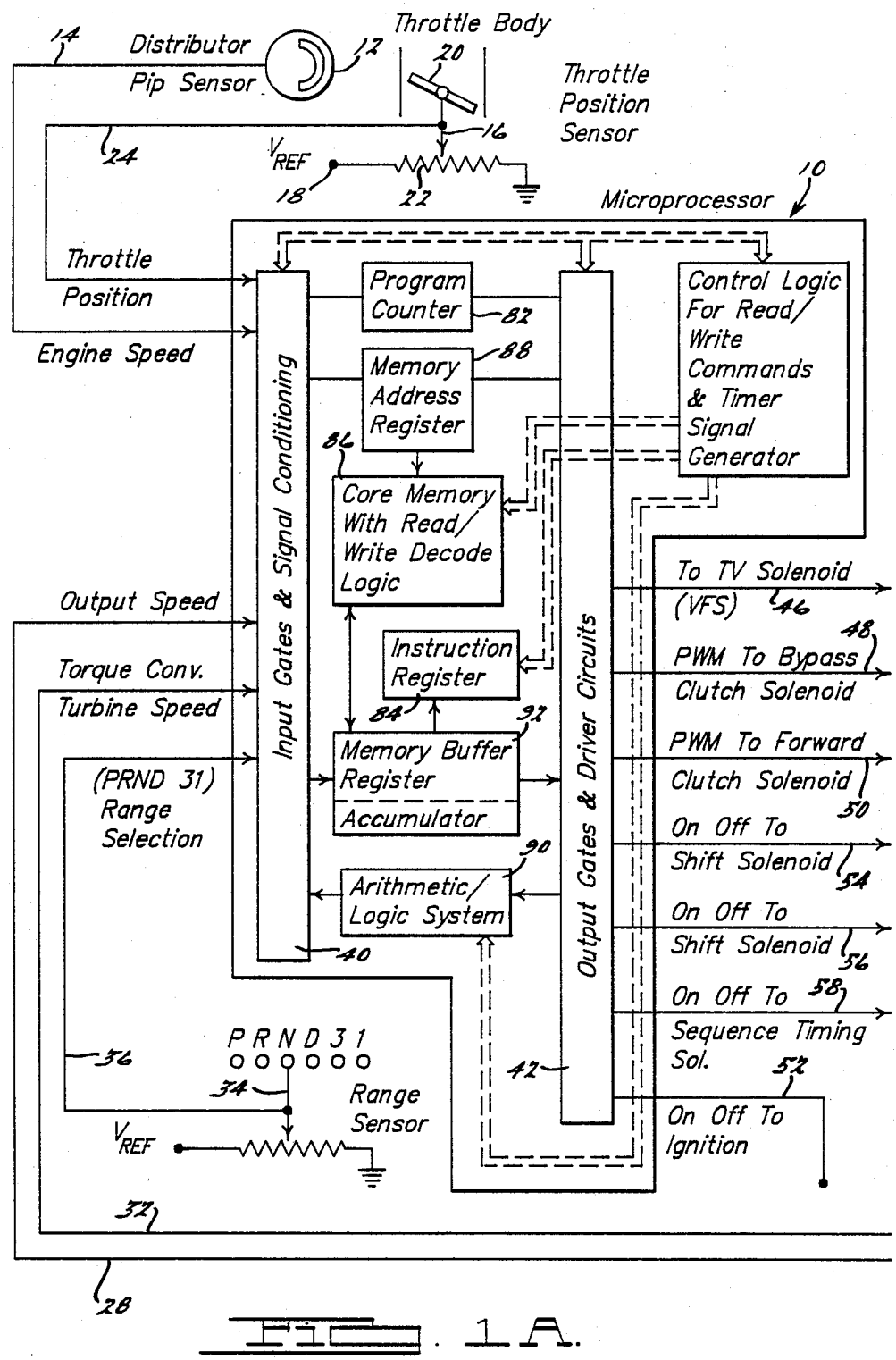
FIG. 1A shows in schematic form the architecture of a controlling the pilot operated servo valve system of my invention.

The schematic drawing of the overall system of which the improved throttle valve and solenoid actuator assembly of my invention is a part is shown in FIG. 1A. The microprocessor or microcomputer is identified by reference numeral 10. It is adapted to receive an engine speed signal from an engine speed sensor such as a distributer PIP sensor 12 from lead 14. A throttle sensor identified by reference numeral 16 includes a variable resistance 22 powered by a reference voltage, the source of which is identified by numeral 18. The engine carburetor throttle 20 is moved by a throttle linkage in the usual fashion, and in doing so an adjustable contact for resistor 22 results in a throttle position signal in lead 24 which is distributed to the microprocessor.

An output speed signal is obtained by a speed sensor schematically shown at 26 on the transmission output shaft. The speed sensor distributes its output signal through lead 28 to the microprocessor.

A torque converter turbine speed signal is obtained from a turbine speed sensor 30 and distributed through lead 32 to the microprocessor.

A range position signal which identifies the driving mode selected by the vehicle operator for the transmission is obtained by a so-called range sensor 34, the output signal of which is distributed through lead 36 to the microprocessor.

The signals developed by the various sensors described heretofore are received through their appropriate leads by an input gate and signal conditioning circuit 40 of the microprocessor 10. The gate acts as switches for the sensor signals and a signal conditioning circuit conditions them for use by the central processor as they are converted to digital form from analog form.

The output of the microprocessor is transferred to output gates and a driver circuit identified generally by numeral 42. These output values are distributed through leads to an electro-hydraulic control circuit 44 which will be described subsequently with reference to FIGS. 12A and 12B. The output of the circuit 42 is distributed to the TV solenoid of FIGS. 2A, 2B and 2C through lead 46. Similarly, the output for controlling the bypass clutch, which will be described with reference to FIG. 1C, is distributed to the controls 44 through lead 48. The signal from the microprocessor for purposes of the forward clutch solenoid control is distributed to the controls 44 through lead 50.

If an ignition interrupt signal is desired, it is developed by the processor and distributed to the on/off device for controlling the engine ignition through lead 52. Shift valve solenoid signals are distributed to the 3-4 shift solenoid, the 2-3 shift solenoid and the sequence timing solenoid through leads 54, 56 and 58, respectively. These elements also will be described subsequently with reference to FIGS. 12A and 12B. Torque converter flow passages that are pressurized with pressure under the control of the valve body are shown at 60, 62 and 66, the latter being a passage for pressure that controls the engagement force of a pressure operated torque converter bypass clutch which will be described with reference to FIG. 1C. pressure is distributed under the control of the valve controls 44 to the forward clutch through passage 68. Similarly, the low and intermediate servo for the transmission is applied with actuating pressure through passage 70, and the release side of the same servo is pressurized by pressure in passage 72. The intermediate clutch is supplied with pressure in passage 74. The corresponding passages for the direct clutch, the overdrive servo and the reverse clutch are shown respectively at 76, 78 and 80. These clutches also will be described with reference to FIG. 1C.

The essential elements of the microprocessor 10 include a program counter 82 which may function as a general register as in the case for the registers of the instruction register 84, but it also contains the address of the instruction that is to be executed following the entry or retrieval of the instruction or data currently in the process of being executed.

The core memory for the microprocessor, which contains read/write logic as well as a decoder logic, is shown at 86. A memory address register usually is provided in a processor of this kind to store the currently addressed memory location, and this is indicated by reference numeral 88. The arithmetic logic for the microprocessor is carried out at location 90 for the purpose of combining words retrieved from different registers, for example, or by carrying out other operations on the data or the words; such as, adding, subtracting or shifting. The control logic at location 92 decodes the digital information of the instruction that currently is located in the instruction register to generate certain logic or timing pulses that may be used by the arithmetic logic system 90.

Figure 1B:
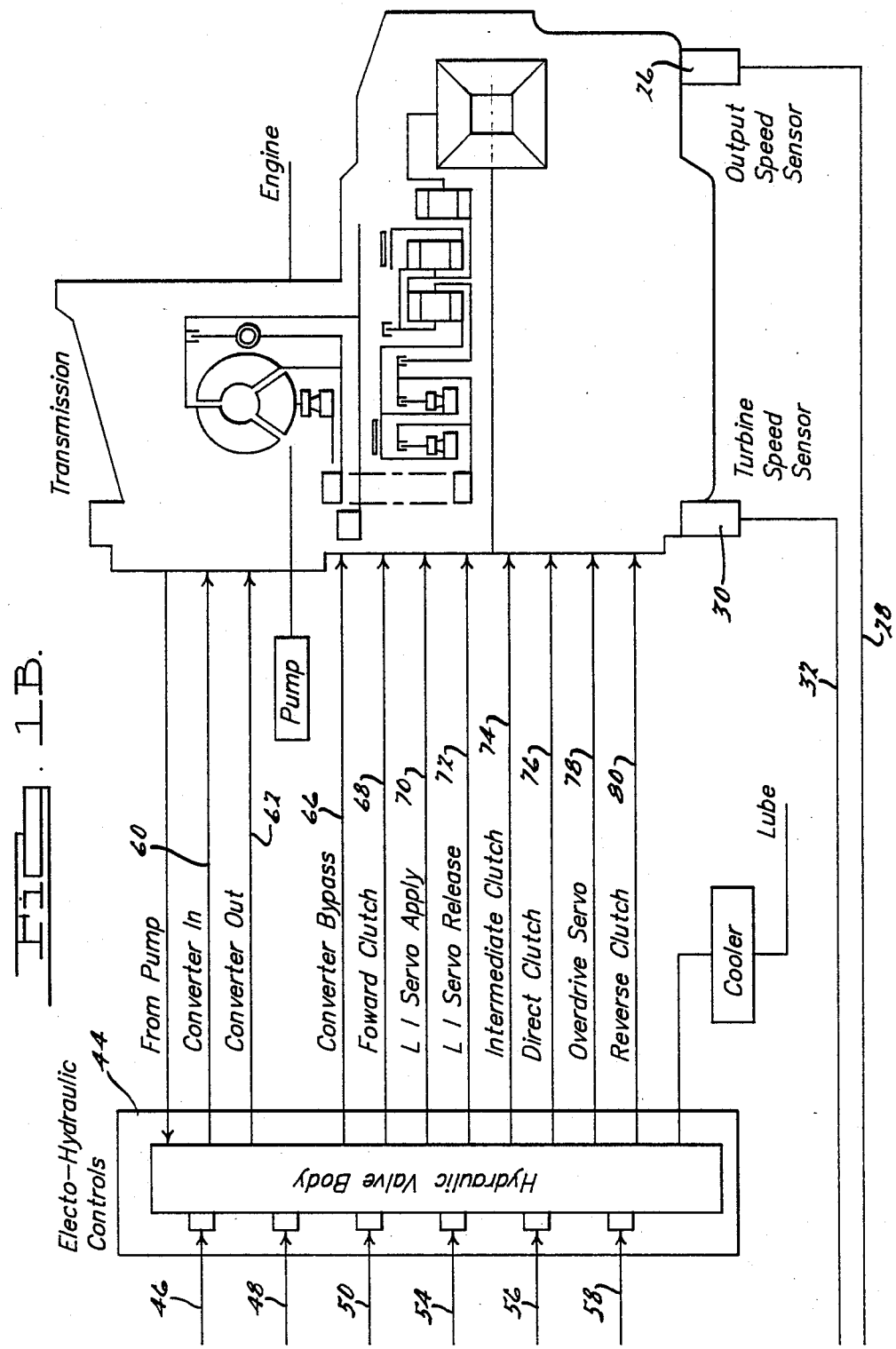

FIG. 1C shows in schematic form the gearing arrangement and the clutches and brakes for the transmission gear system shown generally in FIG. 1B. This transmission gearing arrangement is described fully in U.S. Pat. No. 4,509,389, which is assigned to the assignee of this invention and reference may be had to that patent to complement this disclosure. The present description of the gearing, therefore, will be sufficient only for the purpose of providing an understanding of the mode of operation of the valve system to be described with reference to FIGS. 12A and 12B. That valve system is an adaptation of a valve system shown in U.S. Pat. No. 4,633,738, which also is assigned to the assignee of this invention.

FIG. 1C shows a torque converter at 94. It includes an impeller 96 that is connected to the crankshaft of an engine identified by reference numeral 98. Arranged in toroidal flow relationship with respect to the impeller 96 is a bladed turbine 100 which is connected to turbine shaft 102. Stator 104 includes radially disposed blades arranged between the toroidal flow entrance of the impeller and the toroidal exit of the turbine for the purpose of providing a hydrokinetic torque reaction to effect torque multiplication during operation of the torque converter in the torque converter mode when the converter is operating in the free wheeling mode. An overrunning brake 106 freewheels to allow the stator 104 to float freely.

A torque converter bypass clutch is identified generally by reference numeral 108. When the clutch 108 is applied the impeller is connected to the turbine so that engine torque is distributed directly to the turbine shaft 102 through a mechanical torque delivery path that bypasses the hydrokinetic torque delivery path of the converter 94.

The transmission includes transmission fluid pressure pump 110 which is driven by the engine and connected directly to the engine crankshaft through a central shaft 112. This provides circuit pressure for the valve system of FIG. 13.

Turbine shaft 102 drives a toothed member or sprocket 114 which powers a drive chain that is connected to a cooperating toothed member or sprocket 116 which forms a part of or is connected to sleeve shaft 118.

The gearing includes two simple planetary gear units 120 and 122. The first gear unit 120 has a sun gear 124, a ring gear 126 and planet pinions 128 carried by carrier 130. Ring gear 124 is connected to the carrier 132 of the second gear unit and to output shaft 134. The carrier 130 of the first gear unit is connected to the sun gear 136 of the second gear unit 122. Planet pinions 138 mesh with ring gear 136 and with sun gear 140. These are carried by the carrier 132. Sun gear 140 is adapted to be braked by low and intermediate brake band 142. A reverse brake 144 is adapted to anchor sun gear 136 and carrier 130 during reverse drive.

Sun gear 132 is connected to a brake drum that is adapted to be braked by overdrive brake 146 during overdrive operation.

During operation in the forward drive range, forward drive clutch 148 is engaged. During operation in the direct drive range, direct drive clutch 150 is engaged. During operation in the intermediate speed ratio, intermediate speed ratio clutch 152 is engaged.

Sleeve shaft 118 is connected to one side of the forward clutch 148, and the output side is connected to sun gear 126 through overrunning coupling 154. Sleeve shaft 118 is connected to one side of the direct drive clutch 150 and the output side is connected to sun gear 126 through overrunning coupling 156.

Figures 1D, 3:
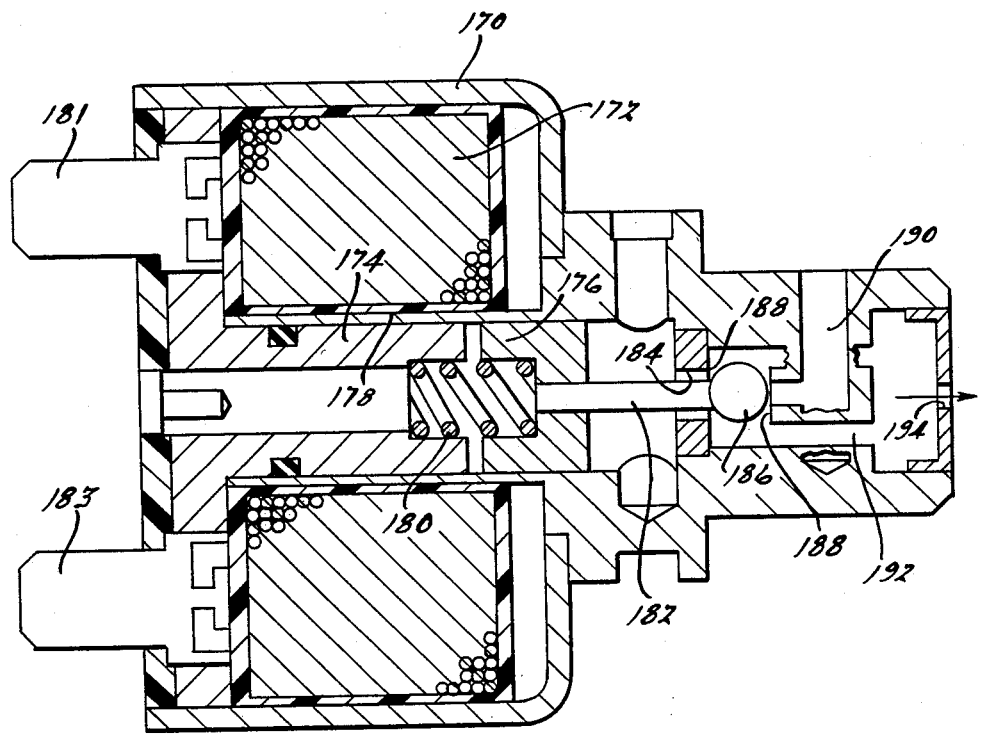
FIG. 1D is a table that shows the relationship of the pattern of engagement and release of the clutch and brake servos to the drive mode of the transmission itself.
FIG. 3 is an enlarged schematic view of the solenoid operator for use in the valve system of FIGS. 2A, 2B and 2C.

The chart of FIG. 1D designates the clutches and brakes that are engaged or released during operation in each of the gear ratios. In order to relate the chart of FIG. 1D to the gearing of FIG. 1C, the term CL1 is used to designate the forward clutch 148, the symbol CL2 is used to designate the intermediate clutch 152, the symbol CL3 is used to designate the direct drive clutch 148 and the symbol CL4 is used to designate the reverse brake or disc clutch 144. Similarly, the symbol B1 is used to designate brake 146 for overdrive operation and the symbol B2 is used to designate the low and intermediate brake 142.

The symbol "X" is used in the chart of FIG. 1D to designate that the clutch or brake so designated is adapted for torque delivery. Similarly, a blank space in the chart of FIG. 1D indicates that the clutch or the brake is released or inactive.

In FIG. 1D the symbol OWC1 designates overrunning coupling 154 and the symbol OWC2 designates the overrunning coupling 156. These symbols are used also in FIG. 1C. In the case of the overrunning couplings, an "X" symbol indicates that torque transfer is occurring between the inner and outer races, and the symbol O/R is used to indicate that the overrunning coupling is freewheeling.

Clutch CL1 is applied during operation in each of the first three driving ratios. Torque from the torque converter turbine shaft then is delivered through the chain to the sleeve shaft 118 and through the engaged clutch CL1. The torque then is transferred through the overrunning coupling 154 to the sun gear 126. Brake B2 is anchored during operation in the first two underdrive ratios and serves as a torque reaction point. Thus torque is multiplied by the gear unit 120 and compounded with the torque multiplication of the second gear unit 122 to produce the maximum overall torque ratio of 2.779. The output torque of the shaft 134 is delivered to the sun gear of the final drive gear unit 158. The gear unit 158 includes a sun gear that is fixed as shown at 160. The output element for the gear unit 158 is the planet pinion carrier 162 which carries pinions engaging the sun gear 164 and ring gear 160. Carrier 162 drives the carrier of a differential gear unit 166. The side gears of the differential gear unit drive an axle half shaft 168 which extends through the sleeve shaft 118. Another axle half shaft extends in the opposite direction although it is not shown. Each axle half shaft is connected to a driving wheel for the vehicle.

Intermediate speed ratio operation is achieved by engaging clutch CL2 while the clutch CL1 and the brake B2 remain applied. This then causes overrunning coupling OWC1 to freewheel while torque is transferred through the overrunning coupling OWC2. The torque input for the gear then is the carrier 130 rather than the sun gear 126, so the torque ratio is reduced to a value of 1.512.

Direct drive is achieved by simultaneously engaging each of the clutches CL1, CL2 and CL3. This causes the gear elements of the gear units 120 and 122 to be locked together for rotation in unison.

Overdrive is obtained by disengaging the clutch CL1 and applying the overdrive brake B1. Thus sun gear 126 now becomes a reaction point and the ring gear 124, with the carrier 130 functioning as a driver, overruns thereby producing an overdrive ratio 0.71. The gear unit 122 thus is inactive as all of the torque is distributed through the first gear unit 120.

Reverse drive is achieved by reengaging the clutch CL1 and disengaging the clutch CL2 while applying the reverse brake or disc clutch 144. Thus the carrier 130 now becomes a reaction point and the sun gear 126 functions again as a driver. This causes the ring gear 124 to rotate in reverse direction, and that reverse motion is transmitted to the output shaft 134.

As will be explained with reference to FIGS. 12A and 12B, the control of line pressure for actuating the clutches and brakes of FIG. 1B, as well as the control pressure for determining the shift points for shift valves that initiate the clutch and brake engagements and releases described previously, requires the presence of a throttle valve of the kind that now will be described with reference to FIGS. 2A, 2B and 2C. This throttle valve produces a pressure signal that is related to the operator's demand for engine torque and to the calibrated torque transmitting capacities of the clutches and brakes of FIG. 1C.

Figure 2A:
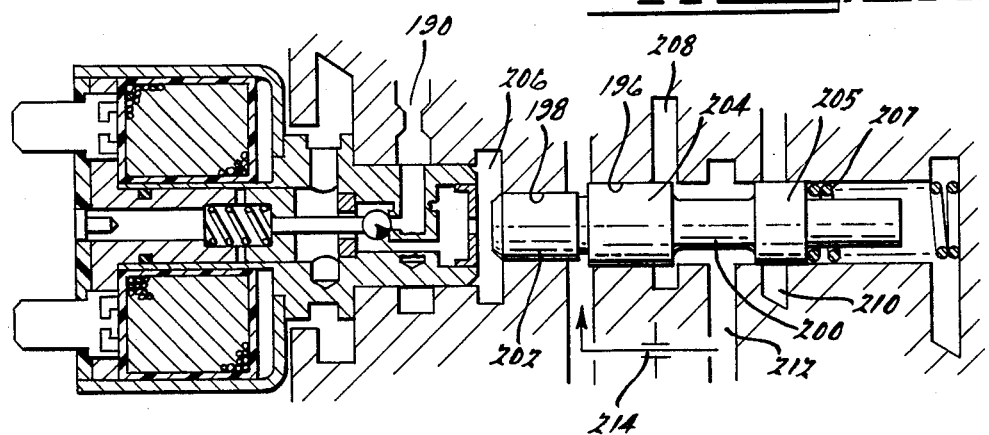
FIG. 2A is a schematic representation of a solenoid valve that includes the features of a first embodiment of my invention.
Figure 2B:
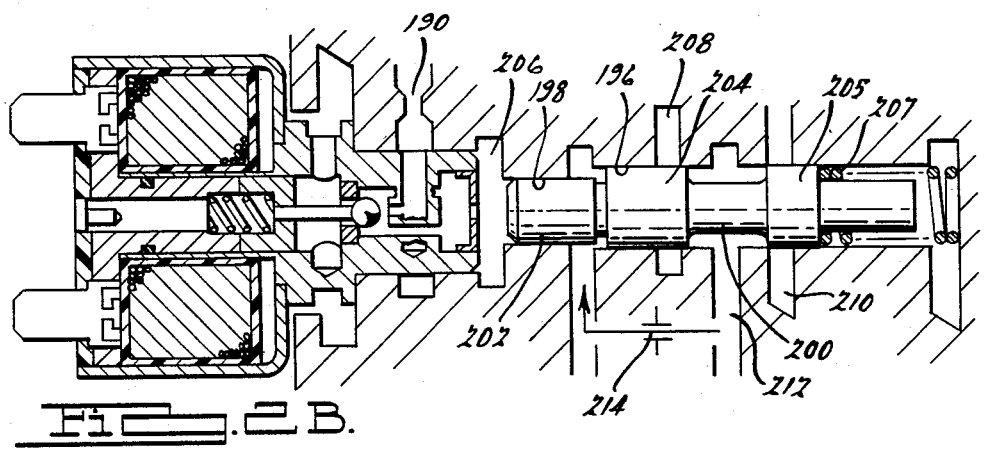
FIG. 2B is a view similar to FIG. 2A but it shows the throttle valve in a different operating state wherein a minimum throttle pressure is developed.
Figure 2C:
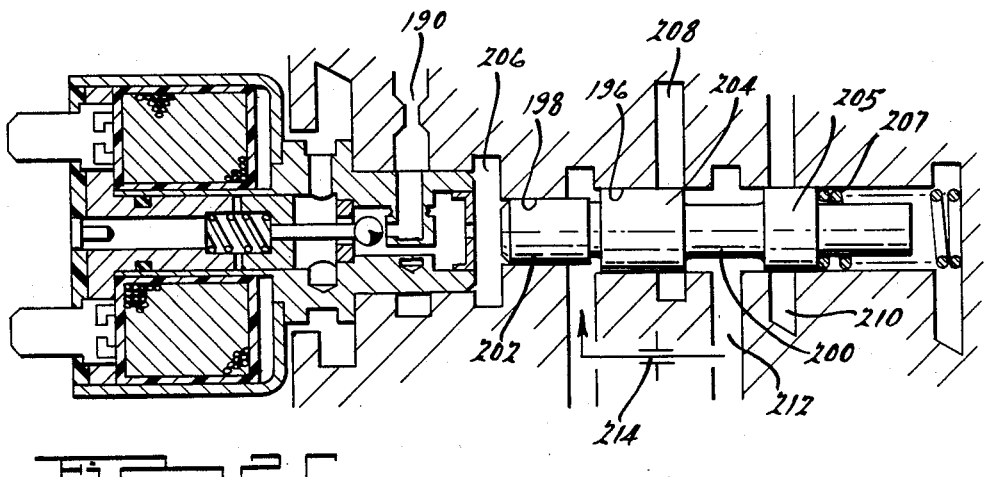
FIG. 2C is a view similar to FIG. 2A but it shows the throttle valve in the position that corresponds to a pressure regulating mode.

The solenoid actuator for the assembly of FIGS. 2A, 2B and 2C is shown in FIG. 3. It includes a solenoid body 170 which encloses solenoid windings 172. The body 170 is mounted on a stem 174 and an adjustable solenoid core or armature 176 is co-axially disposed in central opening 178 of the solenoid body. The armature 176 is urged in a right hand direction as seen in FIG. 3 by control spring 180.

A valve operating stem 182 is carried by the armature 176 and extends through a control orifice 184 to engage valve element in the form of a ball 186.

Valve element 186 engages a valve seat 188 surrounding a valve port that is supplied with solenoid feed pressure through passage 190.

When valve element 186 is shifted in a left hand direction upon movement of the armature 176 in a left hand direction, it seats on the annular valve seat surrounding the orifice 184. The valve seat is shown at 188. An output signal pressure passage 192 communicates with the feed passage 190 through valve port 188. The signal pressure passage communicates through port 194 with the throttle valve chamber which will be described with reference to FIGS. 2A, 2B and 2C.

In FIGS. 2A, 2B and 2C the valve chamber for the throttle valve spool is shown at 196. It includes a reduced diameter portion 198. The valve chamber has internal lands that cooperate with the external lands of a throttle valve spool 200. These lands are shown in spaced relationship at 202, 204 and 205. Valve spool 200 is biased in a left hand direction as seen in FIGS. 2A, 2B and 2C by valve spring 207. Lands 202 and 204 define a differential area because of their differential diameters. The left hand end of the reduced diameter land 202 is subjected to the solenoid signal pressure which is in chamber 206.

Figure 12B:
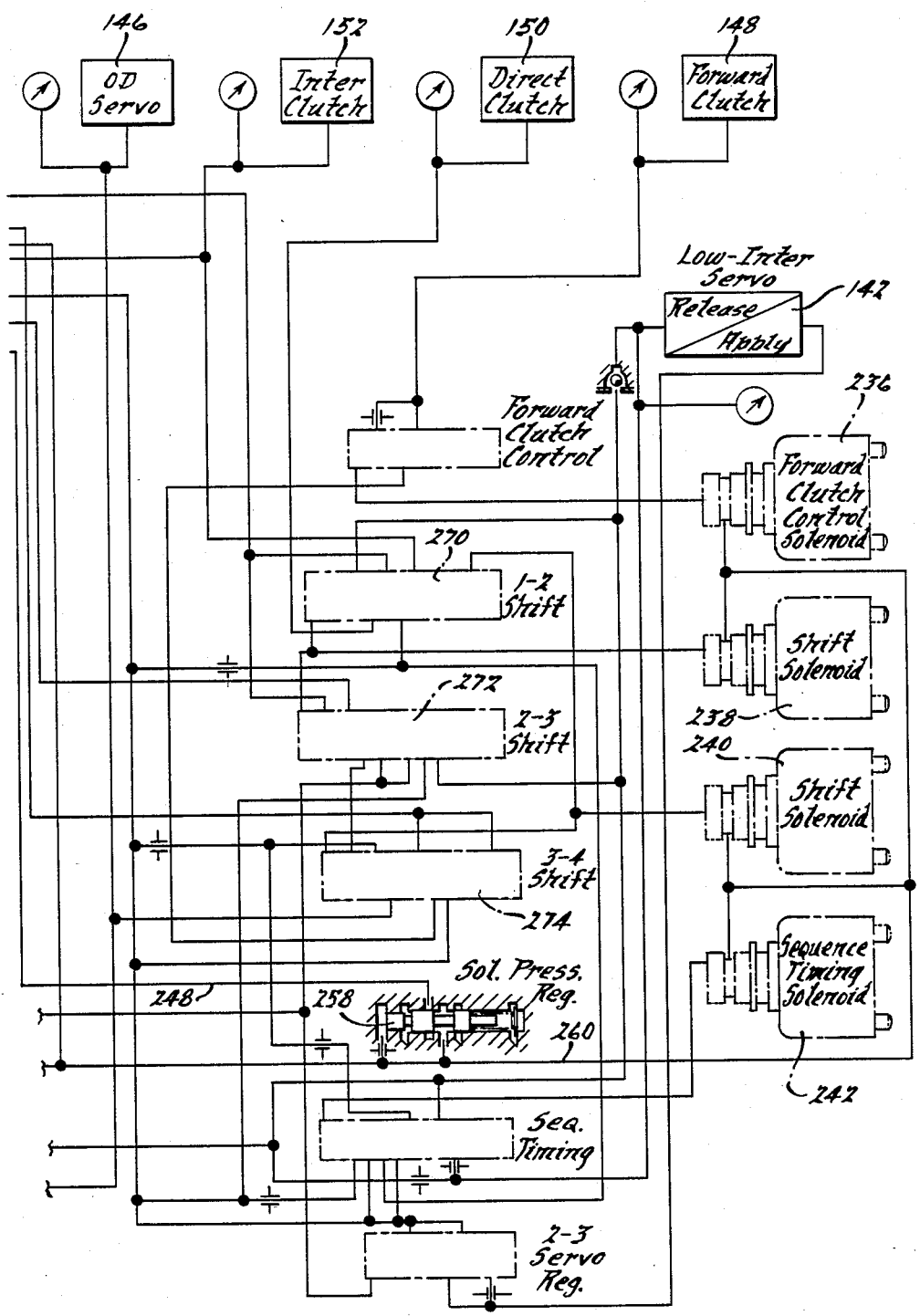

Line pressure, which is developed by the pump 110 and regulated by a regulator valve, as will be explained with reference to FIGS. 12A and 12B, is distributed to the valve chamber through line pressure passage 208. The input port for the line pressure registers with land 204. An exhaust port in the chamber 196 registers with land 205 shown at 210. A throttle pressure port located between lands 204 and 205 communicates with throttle pressure passage 212. The throttle pressure passage communicates with the differential diameter area of lands 202 and 204 through stabilizing orifice 214.

The feed line 190 for the servo pilot valve is supplied with a control pressure that is modulated at a moderate value, and that value is maintained constant throughout the operating ranges for the control system. Thus the pressure that acts on the pressure area of land 202 is determined solely by the duty cycle of the solenoid operator.

Under full throttle conditions the duty cycle is reduced to its minimal value so that the orifice 184 is fully opened and the valve opening to port 190 is fully closed. Thus the pressure output of the solenoid valve which acts on the left hand end of land 202 in chamber 206 is at its minimum value, and therefore the throttle pressure is at its maximum value. If for some reason the electrical voltage should fail or if a malfunction for the solenoid operator should occur, the valve spring 207 will stroke the throttle valve spool 200 to the maximum TV pressure setting.

FIG. 2B shows the relative positions of the valve element 188 and the operating position of the throttle valve spool 200 when the solenoid is actuated to achieve a minimum throttle pressure. In these circumstances the valve element 186 is seated on the valve seat surrounding orifice 184 and the valve seat 188 for the solenoid feed passage is uncovered. This produces a maximum pressure in chamber 206 which results in a minimum TV pressure.

FIG. 2C shows the throttle valve in its regulating position between the minimum value for throttle pressure and the maximum value for throttle pressure. As the duty cycle for the solenoid operator increases, the pressure in the chamber 206 decreases; and conversely, a reduced duty cycle will result in an increase in the pressure in chamber 206.

Figure 4A:
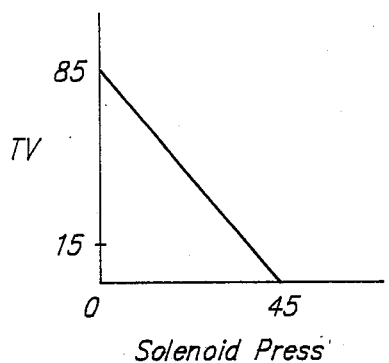
FIG. 4A is a chart that shows the relationship between solenoid pressure and throttle valve pressure for the solenoid valve and throttle valve assembly of FIGS. 2A, 2B and 2C.

The relationship between solenoid pressure in chamber 206 and throttle pressure is shown in FIG. 4A. This demonstrates that an increase in the solenoid pressure will result in a decrease in the throttle pressure and since the spool valve 200 is a linear pressure regulator, the relationship between the two variables is a straight line with a negative slope.

Figure 4B:
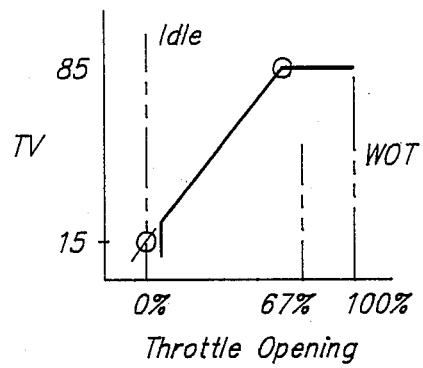
FIG. 4B is a chart that shows the relationship between throttle valve pressure and throttle opening for the assembly of FIGS. 2A, 2B and 2C.

At approximately 45 psi solenoid pressure, in a preferred embodiment of the invention, the throttle opening is approximately ⅝ open as indicated in FIG. 4B. Thus when the throttle opening is plotted against throttle valve pressure, a linear relationship exists between the minimal throttle setting, at idle for example, and the ⅝ wide open throttle setting. At engine throttle settings beyond the ⅝ throttle setting position, the relationship between throttle opening and throttle pressure is constant as indicated by the straight line portion of FIG. 4B.

The solenoid force is a relatively low value compared to the solenoid force that would be required if the solenoid force were to be used to actuate directly a regulating valve spool such as that shown at 200 rather than a pilot valve that in turn operates the valve spool. The output of the throttle valve spool (namely, the throttle pressure) is distributed, as will be described with reference to FIG. 12, to the main regulator valve for the transmission control valve system and to the solenoid pressure regulator valve to establish the proper main regulator valve pressure and solenoid pressure. The solenoid pressure is supplied to the shift solenoids and the shift solenoids respond to the output signals from the microcomputer 10 to initiate the various shift points.

Figure 5A:
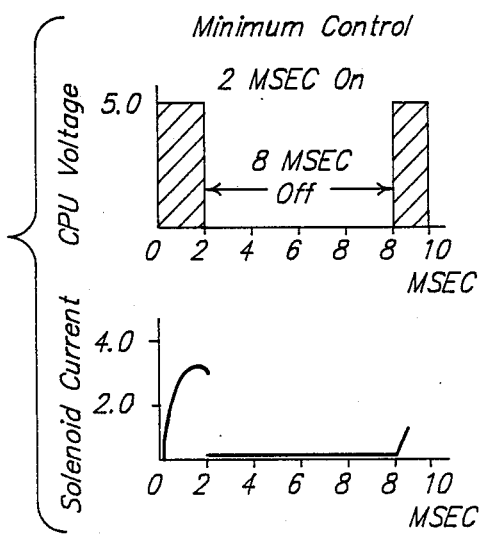
FIG. 5A is a chart showing the response time for the central processing unit of the microcomputer of FIG. 1A. Included in FIG. 5A is a chart showing the relationship of solenoid current plotted against the same abscissa shown for the CPU voltage characteristic. Both of these charts represent a minimum solenoid control.
Figure 5B:
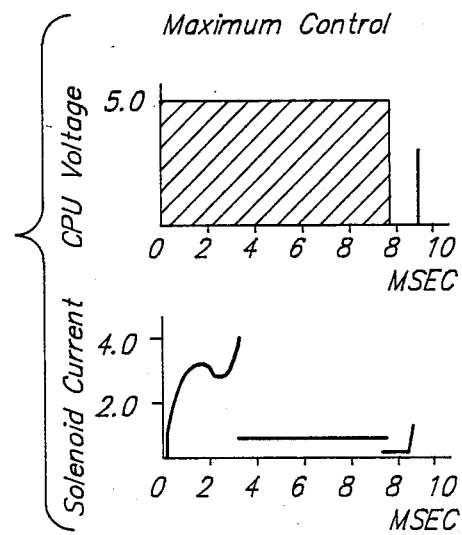
FIG. 5B is a chart similar to the chart of FIG. 5A showing a maximum solenoid control with a maximum solenoid on-time, in contrast to the chart of FIG. 5A which shows a maximum solenoid off-time.
Figure 5C:
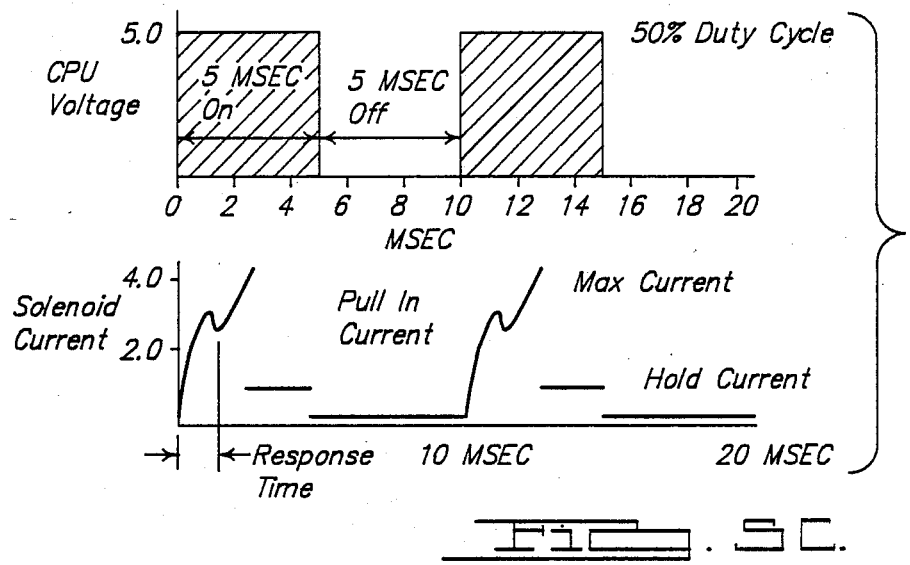
FIG. 5C is a chart similar to the charts of FIGS. 5A and 5B showing the response curves for a 50 percent duty cycle.

FIGS. 5A, 5B and 5C show the response times for the solenoid of FIG. 3 under a minimum control condition, a maximum control condition and a 50 percent duty cycle condition. Under the minimum control condition, the on-time for the solenoid as determined by the output voltage of the central processor unit is about two milliseconds and the corresponding off-time is about 8 milliseconds. The resulting solenoid current is as shown in the graph of FIG. 5A where the solenoid current is plotted against time. Under the maximum control condition, the maximum current distributed to the solenoid of FIG. 3 rises in accordance with the relationship shown in the lower view of FIG. 5B. Thereafter, a hold current exists until approximately 9 milliseconds has elapsed. The off-time under maximum control conditions is about 1 millisecond.

FIG. 5C shows a 50 percent duty cycle wherein the voltage supplied by the central processor unit is on for about 5 milliseconds and is off for about 5 milliseconds. The corresponding solenoid current during the measured response time is illustrated in the lower view of FIG. 5C where the hold current following the peak current is interrupted after about 5 milliseconds. The peak solenoid current does not reoccur until expiration of the 5 millisecond off-time interval The microcomputer stores in its memory the control logic and the information in its core memory necessary to carry out that logic is illustrated in the graphs of FIGS. 6, 7, 8, 9 and 10. That information is called upon by the microcomputer software and will be described very generally with reference to the flow chart of FIG. 11.

Figure 6:
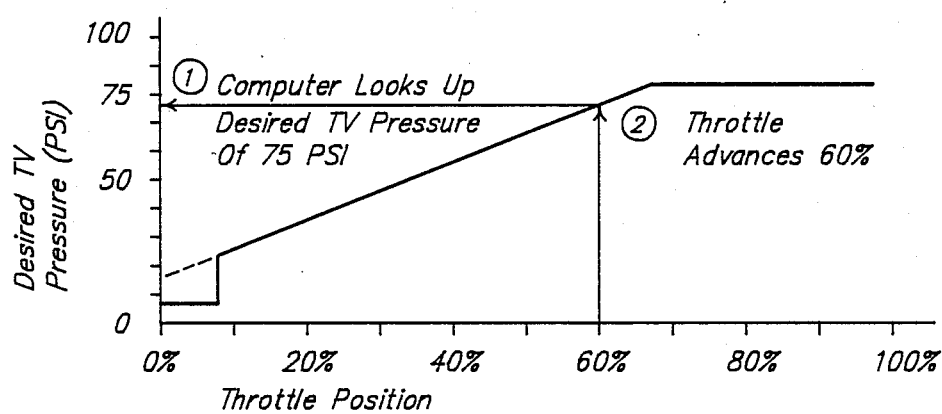
FIG. 6 is a chart showing the relationship between the desired throttle valve pressure and throttle position.
Figure 11:
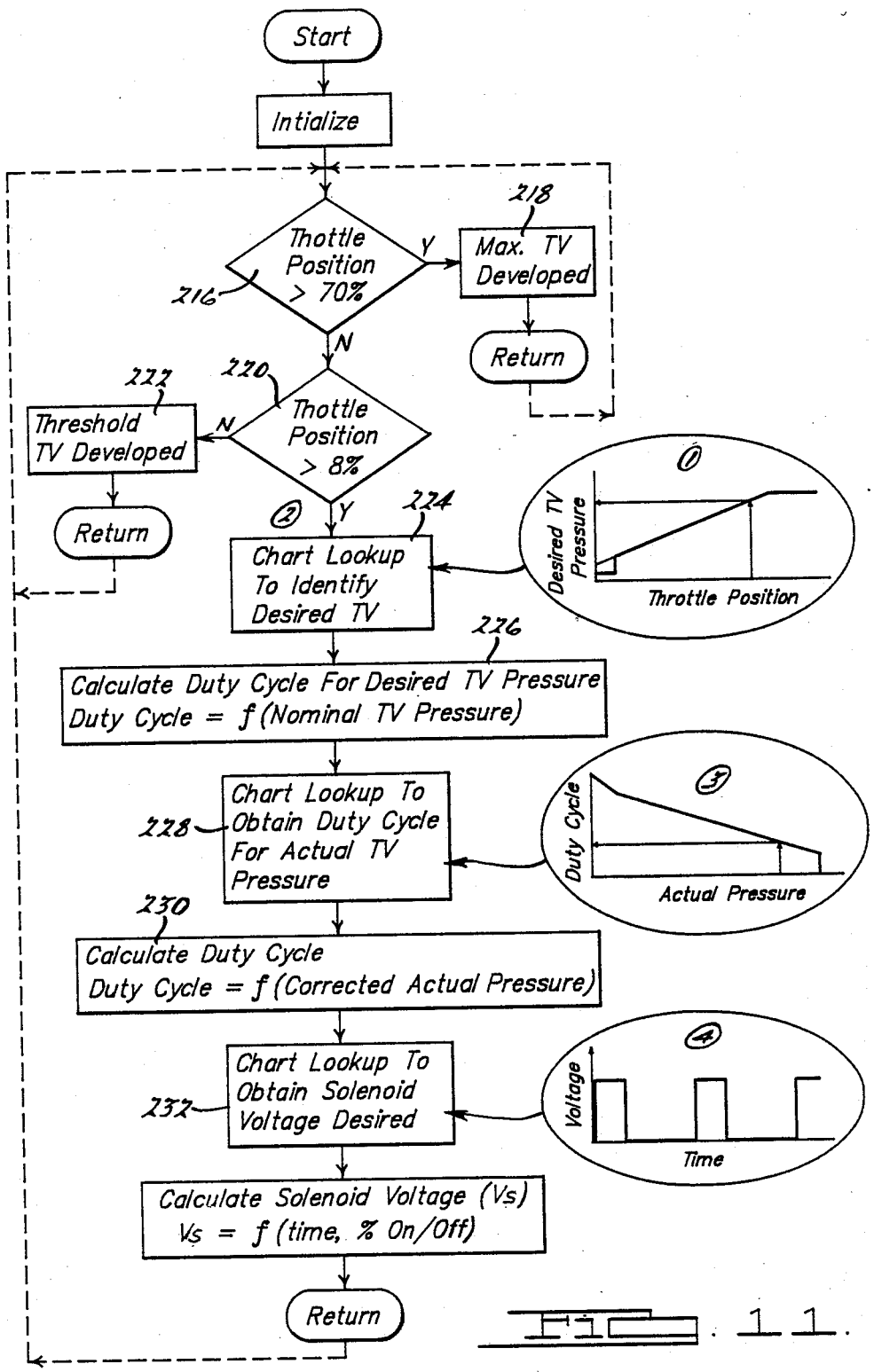
FIG. 11 is a flow chart showing the processing steps initiated by the software for effecting the functions of the control module that forms a part of the microcomputer of FIG. 1A.

In FIG. 11 we have shown the process steps that take place during each background control loop for the microcomputer 10. Following the start of the control loop the registers are initialized and a decision is made at 216 with respect to the actual throttle setting for the engine. If the throttle setting is greater than approximately 70 percent, which approaches the wide open throttle position, the register for the instruction that commands a maximum development of TV pressure is addressed and maximum TV pressure results at step 218. Following the attainment of the maximum pressure, the loop returns to its original position where another throttle setting measurement takes place. If the decision at step 216 is negative, a decision then is made at step 220 with regard to whether the throttle position of the engine is greater than 8 percent, which is slightly above idle or closed throttle. If the result of that inquiry is negative, the processor commands at step 222 the development of a threshold TV pressure. After that is achieved the processor then returns to its starting point and the control loop is completed. If the decision at 220 is positive, the processor then will perform a chart lookup function to identify the desired TV pressure. The information then is stored in a memory register which is addressed at step 224 as illustrated in the circled diagram. That diagram is a representation of the information shown in FIG. 6 for any given throttle position between the maximum setting and the threshold setting. The information of FIG. 6 is addressed to determine the desired TV pressure. In the example given in FIG. 6, the desired pressure is 75 psi for a throttle position setting of 60 percent.

Figure 7:
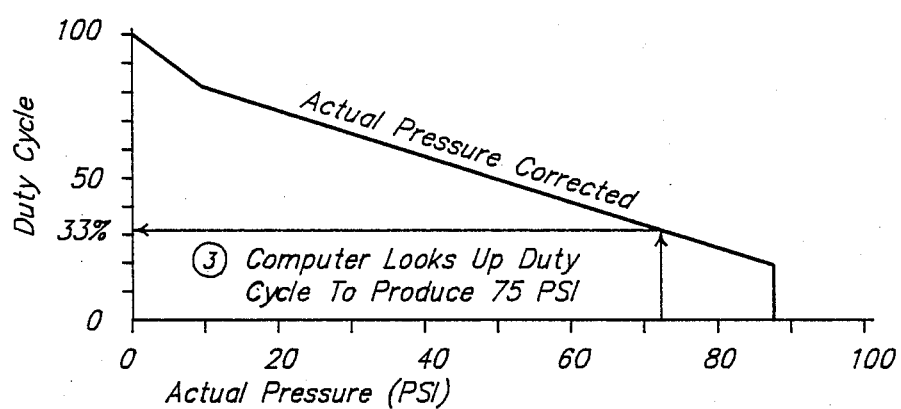
FIG. 7 is chart showing the relationship between the duty cycle for the solenoid actuator and the actual pressure.
Figure 8:
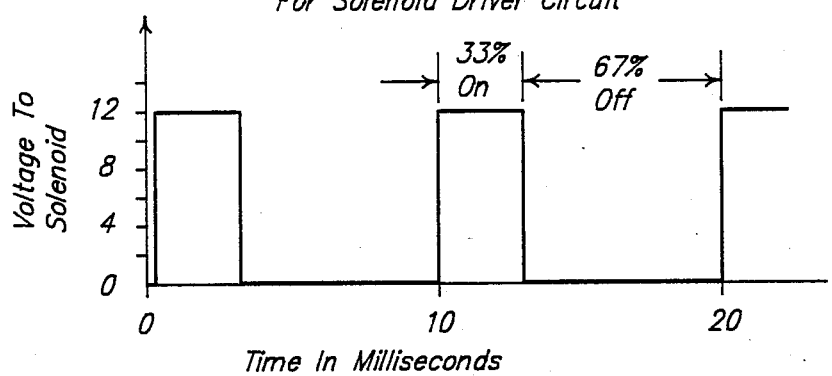
FIG. 8 is a chart showing the duty cycle for the solenoid of FIGS. 2A, 2B and 2C.
Figure 8:
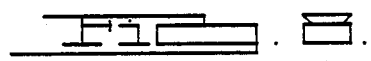
Figure 9:
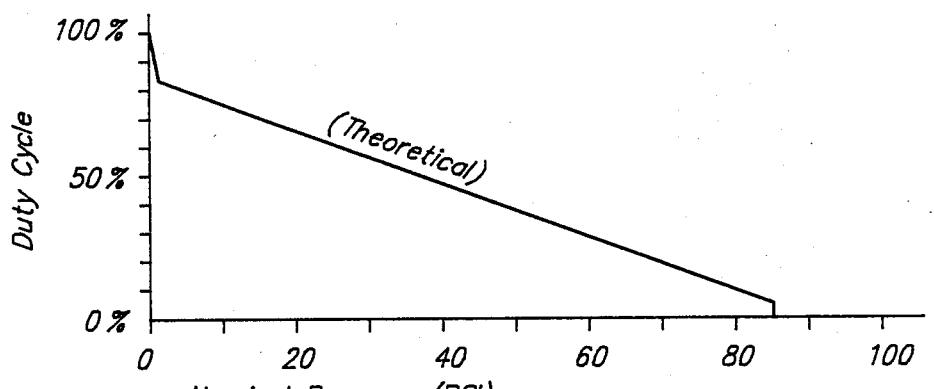
FIG. 9 is a chart showing the relationship between duty cycle and nominal pressure which is stored in the memory of the microcomputer of FIG. 1A.
Figure 9:
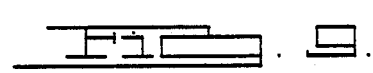
Figure 10:
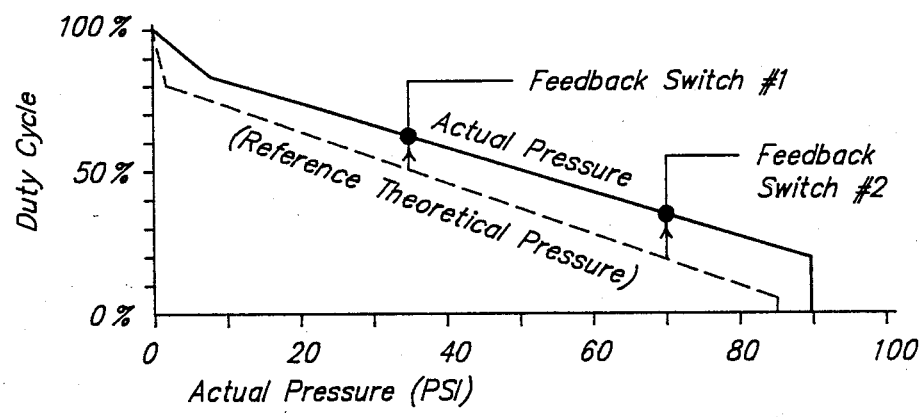
FIG. 10 is a chart showing the relationship between duty cycle and the actual pressure which is stored in the memory of the microcomputer of FIG. 1A.
Figure 10:
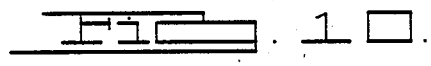

Having achieved that result in step 224, the information fetched from the register where the information was stored is transferred to the arithmetic unit where a calculation takes place to determine duty cycle. This occurs at step 226. The duty cycle that results for any given actual pressure is illustrated in FIG. 7. In the example previously described where the throttle setting was 70 percent, the duty cycle that is chosen to produce a 75 percent throttle valve pressure is 33 percent as shown in FIG. 7. Step 228 in FIG. 11 shows a table lookup Step 230 is a calculation step where the duty cycle is determined as a function of the actual pressure.

At step 232 the processor commands a 33 percent duty cycle in the example described above for the solenoid driver circuit. Following the completion of that calculation where the voltage of the solenoid is determined as the function of time and the duty cycle, the control loop then returns to its original state and the cycle is repeated. If a change has occurred in the interval from one control loop to another, appropriate changes are made in the fashion described previously so that the duty cycle, in response to changing variables received from the sensors described previously is changed to effect an altered solenoid force which results in the desired throttle pressure. Numerals 1, 2, 3 and 4 are used in FIGS. 6, 7 and 8 to correlate the functions shown in those figures with the corresponding steps in the flow diagram of FIG. 11, where those same numerals are found.

FIG. 12A and 12B shows in schematic form the relationship between a throttle pressure valve and the elements that respond to its output pressure. The TV solenoid assembly of FIG. 3 is generally designated in FIG. 12A at 234. In FIG. 12B the solenoids that control the ratio shifts described previously are identified by reference numerals 236, 238, 240 and 242. The pump 110 delivers pressure to a main regulator valve 244. The regulated line pressure of the main regulator valve 244 is distributed to line pressure passage 246 and 248. A valve spring 247 acts at one end of the regulator valve spool and feedback pressure acts on a regulated pressure feedback area 250 on the valve spool so that the degree of communication between the outlet pressure passage 252 of the pump and the regulated line pressure passage 248 is controlled. The converter pressure regulator valve shown at 254 communicates with the valve chamber for the main regulator valve spool through passage 256.

The control solenoids 236, 238 and 242 receive solenoid pressure from a solenoid pressure regulator valve 258, which receives line pressure from passage 248. The output signal from the solenoid pressure regulator valve is distributed to the control solenoids through feed passage 260 which corresponds to the passage 190 as shown in FIGS. 2A, 2B and 2C.

The solenoid pressure regulator valve 258 is a simple valve spool that regulates the pressure in passage 248 under the influence of a valve spring that urges the valve spool in a left hand direction and feedback pressure that acts on the differential area on the left hand valve lands of the valve spool for regulator 258 to produce a constant regulated pressure in passage 260. It is this constant regulated pressure that is distributed to the solenoid feed passage 190 of FIGS. 2A, 2B and 2C.

The regulated line pressure of the main regulator valve that is distributed to passage 248 is distributed to line pressure passage 208 of FIGS. 2A, 2B and 2C.

Manual valve 262 receives regulated line pressure from passage 264 and distributes it to the forward clutch control of the 1-2 shift valve, the 2-3 shift valve and the 3-4 shift valve, as well as other control pressure points. The pattern of the distribution depends upon the position of the manual valve that is selected by the vehicle operator. These various positions are shown by the symbols 1, 3, D, N, R, and p, which respectively identify the first maximum underdrive ratio, the third or direct drive ratio, the automatic drive range where automatic ratio changes occur throughout the entire ratio range, the neutral condition, reverse drive position and the park position. During overdrive operation and during operation in the drive mode 3, as well as in the drive mode 1, passage 266 is pressurized. Passage 268 is pressurized when the manual valve is in the drive mode positions 3 and 1. For a description of a manual valve and shift valve arrangement that is related to the schematic representation of FIG. 4. Reference may be made to U.S. Pat. No. 4,633,738 which is assigned to the assignee of this invention.

For the purpose of correlating the circuit diagram of FIG. 12 to the gear system illustrated in FIG. 1C, the reference numerals for the clutch and brake servos in FIG. 12 are common to the corresponding reference numerals used to describe the clutch and brake elements of FIG. 1C. The torque converter circuit is supplied by a feed passage, and a return passage completes the torus flow path. The clutch control passage is relatively pressurized by a bypass clutch control valve, which also controls the feed and return passages.

The 1-2 shift valve and the 2-3 shift valve and the 3-4 shift valve operate in a manner similar to the manner of operation of the shift valves of U.S. Pat. No. 4,633,738 to distribute actuating pressure to the various servos 146, 152, 148 and 142. The latter servo has an apply side and a release side so that when both the apply side and the release side of the servo, which are on opposite sides of an actuator piston, are pressurized the servo is released. When the release pressure is exhausted by the 1-2 shift valve upon actuation of the 1-2 shift valve in response to the shift command by the processor, the servo 142 becomes applied. This mode of operation of the servo also is described in U.S. Pat. No. 4,633,738. The 1-2 shift valve for triggering the operation of the servo 142 is shown at 270. The corresponding shift valve for effecting a 2-3 shift is shown at 272 and the corresponding shift valve for effecting a 3-4 shift is shown at 274. These shift valves operate in a manner corresponding to the shift valves of U.S. Pat. No. 4,633,738.

The throttle valve pressure developed by the TV pressure valve assembly of FIGS. 2A, 2B and 2C is distributed from passage 212 to one end of the main regulator valve to complement the force of the valve spring 248. Thus when the TV pressure increases the regulated line pressure of the main regulator valve increases correspondingly, thus increasing the capacity of the clutch and brake servos when the torque demand increases.

In the event that an electrical failure should occur, the pressure in passage 212 will rise to its maximum value as explained previously. The loss of an electrical solenoid voltage thus will not result in a loss of torque transmitting capacity as clutch and brake servos. Further, a minimal amount of leakage occurs across the orifice 184 of FIG. 3 because the solenoid is fed with the relatively constant pressure from the low pressure source. In the case of the embodiment described with reference to FIG. 4 that low pressure source is the solenoid pressure regulator valve 258.

Figure 13:
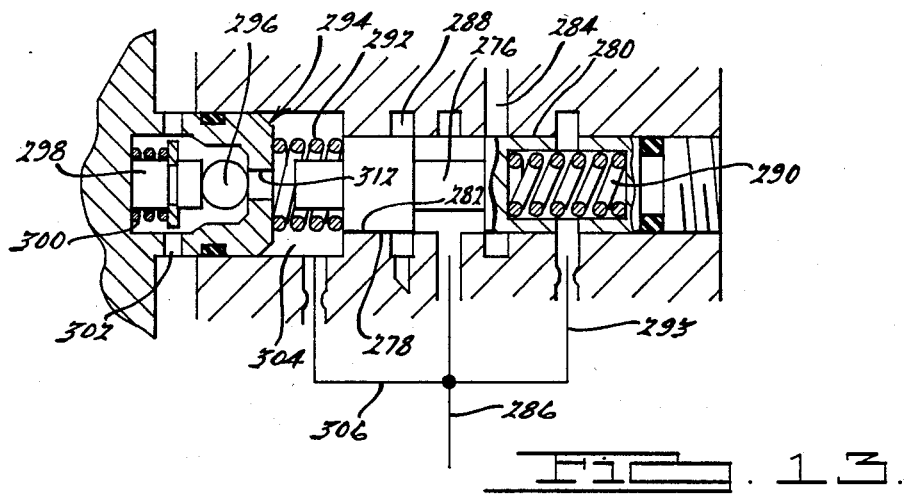
FIG. 13 is a second embodiment of a variable force solenoid and pilot valve assembly that forms a counterpart for the structure of FIGS. 2A, 2B and 2C.

In FIG. 13 I have shown an alternate embodiment of the solenoid and pilot valve assembly of FIG. 3 and FIGS. 2A, 2B and 2C. As in the case of the embodiment of FIGS. 2A, 2B and 2C, the embodiment of FIG. 13 uses a pilot valve for controlling a regulator valve spool which develops the TV output pressure. A relatively low solenoid force level is required and the solenoid armature travel is minimal. As in the case of the embodiment of FIGS. 2A, 2B and 2C, the embodiment of FIG. 13 uses a pilot ball valve that will not stick due to contamination. A relatively low solenoid force level is required in both embodiments because of the relatively small diameter valve seat for the pilot ball valve.

The embodiment of FIG. 13 differs from the first embodiment because it is fed with TV pressure rather than with a constant low pressure from a low pressure source such as the solenoid pressure regulator valve 258 described with reference to FIG. 12. The valve that develops the output throttle valve pressure in the FIG. 13 embodiment will modulate over a greater pressure range; for example, from zero psi to 70 psi instead of the pressure range illustrated in FIG. 4A, which describes the pressure regulating characteristic typical of the embodiment of FIGS. 2A, 2B and 2C. Thus less hydraulic amplification is required and it is less sensitive, therefore, to pressure variations in the output pressure of the pilot valve assembly.

In FIG. 13 the throttle valve spool is shown at 276. The valve spool has equal diameter lands 278 and 280 which register with internal lands formed in valve bore 282. Pump pressure regulated by the main pressure regulator valve is distributed to pump chamber 282 through passage 284. Communication between passage 284 and the output throttle pressure signal passage 286 is controlled by land 280. Direct communication between passage 284 and the exhaust port 288 is controlled by land 282. Valve spring 290 urges the valve spool 276 in a left hand direction and tends to decrease the pressure in passage 286. Regulator valve spring 292 urges the valve in the opposite direction and tends to increase the pressure in passage 286. Feedback pressure passage 293 acts on the right side of the land 280 and provides a feedback pressure for the regulating action of the valve 276.

Unlike the pilot valve assembly of FIGS. 2A, 2B and 2C, which is normally open, the pilot valve assembly shown at 294 in FIG. 13 is normally closed. It does, however, have common features insofar as the construction of the valve and the armature is concerned. The valve includes a ball valve element 296 which corresponds to ball valve element 186 of FIG. 3. The actuator rod or armature for the solenoid shown at 298 corresponds to the actuator rod 182 of FIG. 3. Valve spring 300 tends to normally-close the ball valve element 286, unlike the valve spring 180 which tends to open the ball valve element 186 of FIG. 3.

Figure 13A:
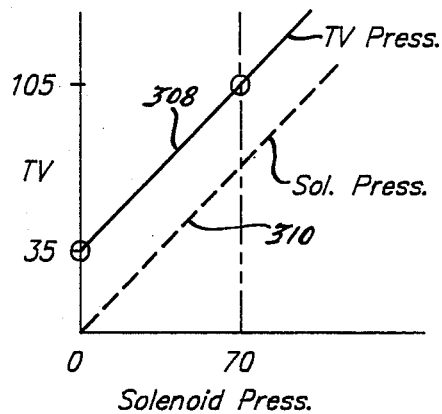
FIG. 13A is a chart showing the relationship between throttle pressure and solenoid pressure for the variable force solenoid and pilot valve assembly of FIG. 13.

The left hand side of the ball valve element is exhausted through exhaust port 302. The right hand side of the ball valve element is subjected to the pressure in chamber 304 which is occupied by actuator spring 292. That same pressure complements the force of the spring 292. The pressure chamber is fed with TV pressure through TV pressure passage 306. It is this feedback feature of the TV pressure that allows the regulator valve 276 to modulate over a greater pressure range and this regulating characteristic is shown in FIG. 13A. The relationship between solenoid pressure and TV varies linearly with a positive slope as shown at 308. The component of that pressure that is due to the feedback of throttle valve pressure is illustrated with a dot and dash linear relationship 310. Also the valve will operate with a relatively constant and low leakage flow across the orifice identified by numeral 312, which is controlled by the ball valve element 296.

Figure 13B:
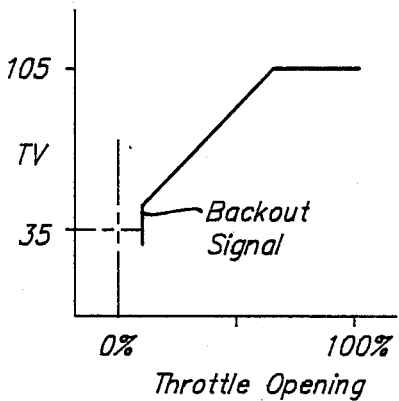
FIG. 13B is a chart showing the relationship between throttle opening and throttle pressure for the embodiment of FIG. 13.
Figure 13C:
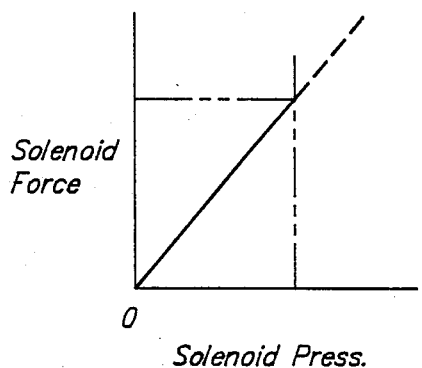
FIG. 13C is a chart showing the relationship between solenoid pressure and solenoid force for the embodiment in FIG. 13.

FIG. 13B shows the relationship between engine throttle opening and the TV pressure that is developed in the embodiment of FIG. 13 and the relationship between solenoid force and solenoid pressure is shown in FIG. 13C. FIGS. 13B and 13C correspond respectively to the FIGS. 4B and 4C, which illustrate the characteristics of the embodiment of FIGS. 2A, 2B and 2C. A relatively low force for the embodiment of FIG. 13, as seen in FIG. 13C, is achieved notwithstanding the fact that the solenoid pressure is regulated over a relatively large range from zero to 70 psi in comparison to the range of approximately zero to 45 psi in FIG. 4C. Although the solenoid force required in FIG. 13B to achieve a regulating range of zero to 70 psi is greater than the corresponding range of FIG. 4C, it still is relatively small in comparison to the solenoid force that would be required if the solenoid force were to act directly on the regulating valve spool that develops the TV pressure.

Although I have described a pulse width modulated solenoid actuator in the embodiment of FIGS. 2A, 2B and 2C and in the embodiment of FIG. 13, it is possible to use a variable force solenoid in either case rather than a pulse width modulated solenoid to obtain the characteristics shown in FIGS. 4A, 4B and 4C and in FIGS. 13A, 13B and 13C.

Having described preferred forms of my invention, what I claim and desire to secure by U.S. Letters Patent is:

1. In a control system for an electronically controlled automatic transmission having multiple ratio gearing, fluid pressure operated clutch and brake servos for controlling the relative motion of the gear elements to effect ratio changes, a control pressure passage communicating with said servos, a control pressure pump and a fluid pressure regulator valve communicating with said control pressure passage for maintaining a predetermined control system pressure, the improvement comprising:

a throttle valve assembly including;

a pressure regulating throttle valve in communication with said regulator valve, including a pressure inlet port in said throttle valve communicating with said control pressure passage, a low pressure port in said throttle valve communicating with a low pressure region of said control system, a valve spring acting on said throttle valve, a throttle valve outlet pressure port and a throttle valve outlet pressure area on said throttle valve communicating with said outlet pressure port thereby establishing a pressure modulating function;

a pilot valve assembly comprising a valve orifice, a valve element registering with said valve orifice and adapted thereby to control the flow through said orifice;

a solenoid actuator having an armature engagable with said valve element, a spring acting on said armature whereby the effective solenoid force acting on said valve element is the algebraic sum of the solenoid electromotive force and the actuator spring force;

an exhaust port communicating with one side of said valve element, a control pressure chamber, means for distributing a regulated control pressure of reduced value to said pressure chamber, said regulated control pressure acting on the other side of said valve element and on said throttle valve; and a microprocessor controller with input signal sensors for said solenoid actuator including means for developing a solenoid actuator voltage signal in response to varying transmission operating variables whereby said pilot valve assembly establishes a throttle valve actuating function in response to solenoid force changes of reduced magnitude.

2. The combination as set forth in claim 1 including a source of a regulated, constant, low control pressure, said means for distributing said regulated control pressure communicating with said pressure source whereby said constant control pressure is distributed to said throttle valve and to said pilot valve assembly on said other side of said valve element.

3. The combination as set forth in claim 1 wherein said means for distributing a regulated control pressure communicates with said throttle valve outlet pressure port and wherein said throttle valve and said pilot valve assembly are subjected to the pressure developed at said throttle valve outlet pressure port, said throttle valve outlet pressure acting on said other side of said valve element and on said throttle valve to establish a pressure force on each, the pressure force thus established on said throttle valve opposing the pressure established by the throttle valve outlet pressure force acting on said throttle valve outlet pressure area.

4. The combination as set forth in claim 1 wherein said solenoid actuator is a pulse-width modulated (PWM) solenoid.

5. The combination as set forth in claim 1 wherein said solenoid actuator is a variable force solenoid.

6. In a control system for an electronically controlled automatic transmission having multiple ratio gearing, fluid pressure operated clutch and brake servos for controlling the relative motion of the gear elements to effect ratio changes, a control pressure passage communicating with said servos, a control pressure pump and a fluid pressure regulator valve communicating with said control pressure passage for maintaining a predetermined control system pressure, the improvement comprising:

a throttle valve assembly including;

a pressure regulating throttle valve in communication with said regulator valve including a pressure inlet port in said throttle valve communicating with said control pressure passage, a low pressure port in said throttle valve communicating with a low pressure region of said control system, a valve spring acting on said throttle valve, a throttle valve outlet pressure port and a throttle valve outlet pressure area on said throttle valve communicating with said outlet pressure port thereby establishing a pressure modulating function;

a pilot valve assembly comprising a valve orifice, a valve element registering with said valve orifice and adapted thereby to control the flow through said orifice;

a solenoid actuator having an armature engagable with said valve element, a spring acting on said armature whereby the effective solenoid force acting on said valve element is the algebraic sum of the solenoid electromotive force and the actuator spring force;

an exhaust port communicating with one side of said valve element, a control pressure chamber, means for distributing a regulated control pressure of reduced value to said pressure chamber, said regulated control pressure acting on the other side of said valve element and on said throttle valve;

a microprocessor controller with input signal sensors for said solenoid actuator including means for developing a solenoid actuator voltage signal in response to varying transmission operating variables whereby said pilot valve assembly establishes a throttle valve actuating function in response to solenoid force changes of reduced magnitude;

said regulator valve being in communication with said throttle valve outlet pressure port whereby the regulated pressure made available to said clutch and brake servos is determined by the magnitude of the pressure at said throttle valve outlet pressure port.

7. The combination as set forth in claim 6 including a source of a regulated, constant, low control pressure, said means for distributing said regulated control pressure communicating with said pressure source whereby said constant control pressure is distributed to said throttle valve and to said pilot valve assembly on said other side of said valve element.

8. The combination as set forth in claim 6 wherein said means for distributing a regulated control pressure communicates with said throttle valve outlet pressure port wherein said throttle valve and said pilot valve assembly are subjected to the pressure developed at said throttle valve outlet pressure port, said throttle valve outlet pressure acting on said other side of said valve element and on said throttle valve to establish a pressure force on each, the pressure force thus established on said throttle valve opposing the pressure established by the throttle valve outlet pressure force acting on said throttle valve outlet pressure area.

9. In a control system for an electronically controlled automatic transmission having multiple ratio gearing, fluid pressure operated clutch and brake servos for controlling the relative motion of the gear elements to effect ratio changes, a control pump and a fluid pressure regulator valve communicating with said pump for maintaining a predetermined control system pressure, the improvement comprising:

a throttle valve assembly including:

a pressure regulating throttle valve in communication with said regulator valve, a pressure inlet port in said throttle valve communicating with said pump, a low pressure port in said throttle valve communicating with a low pressure region of said control system, a valve spring acting on said throttle valve, a throttle valve outlet pressure port and a throttle valve outlet pressure area on said throttle valve communicating with said outlet pressure port thereby establishing a pressure modulating function;

a pilot valve assembly comprising a valve orifice, a valve element registering with said valve orifice and adapted thereby to control the flow through said orifice;

a solenoid actuator having an armature engagable with said valve element, a spring acting on said armature whereby the effective solenoid force acting on said valve element is the algebraic sum of the solenoid electromotive force and the actuator spring force;

an exhaust port communicating with one side of said valve element, a control pressure chamber, means for distributing a regulated control pressure of reduced value to said pressure chamber, said regulated control pressure acting on the other side of said valve element and on said throttle valve;

a microprocessor controller with input signal sensors for said solenoid actuating including means for developing a solenoid actuator voltage signal in response to varying transmission operating variables whereby said pilot valve assembly establishes a throttle valve actuating function in response to solenoid force changes of reduced magnitude;

said regulator valve being in communication with said throttle valve outlet pressure port whereby the regulated pressure made available to said clutch and brake servos is determined by the magnitude of the pressure at said throttle valve outlet pressure port; and said microprocessor having registers for storing data and instruction registers and means for addressing said data and instructions and transferring them to arithmetic portions of said microprocessor whereby output signals are developed in response to changing transmission operating variables sensed by said sensors.

10. The combination as set forth in claim 9 including a source of a regulated, constant, low control pressure, said means for distributing said regulated control pressure communicating with said pressure source whereby said constant control pressure is distributed to said throttle valve and to said pilot valve assembly on said other side of said valve element.

11. The combination as set forth in claim 9 wherein said means for distributing a regulated control pressure communicates with said throttle valve outlet pressure port wherein said throttle valve and said pilot valve assembly are subjected to the pressure developed at said throttle valve outlet pressure port, said throttle valve outlet pressure acting on said other side of said valve element and on said throttle valve to establish a pressure force on each, the pressure force thus established on said throttle valve opposing the pressure established by the throttle valve outlet pressure force acting on said throttle valve outlet pressure area.

* * * * *

UNITED STATES PATENT AND TRADEMARK OFFICE
CERTIFICATE OF CORRECTION

PATENT NO.   : 4,919,012
DATED        : April 24, 1990
INVENTOR(S)  : Ralph C. Bolz It is certified that error appears in the above-identified patent and that said Letters Patent is hereby corrected as shown below:

Column 1, line 23, after "governor" insert a period (.).
Column 2, line 36, after "a" insert --microcomputer for--.
Column 3, line 13, after "is" insert --a--.
Column 3, line 17, after "solenoid" insert --operator--.
Column 4, line 39, "pressure" should be --Pressure--.
Column 9, line 25, after "interval" insert a period (.).
Column 10, line 7, after "lookup" insert a period (.).
Column 10, line 35, "passage" should be --passages--.
Column 11, line 3, "p" should be --P--.
Column 11, line 14, delete ". Reference" and insert --, reference--.
Column 16, line 18, "actuating" should be --actuator--.

Signed and Sealed this

First Day of October, 1991

Attest:

HARRY F. MANBECK, JR.

*Attesting Officer*   *Commissioner of Patents and Trademarks*